United States Patent [19]

Djernes

[11] 4,261,293

[45] Apr. 14, 1981

[54] APPARATUS FOR STARTING HORSE RACES AND METHOD AND MEANS FOR MANUAL AND REMOTE CONTROL THEREOF

[76] Inventor: William E. Djernes, 14045 Shannon Rd., Los Gatos, Calif. 95030

[21] Appl. No.: 70,910

[22] Filed: Aug. 29, 1979

[51] Int. Cl.³ .......................... A01K 15/04; B68B 1/12
[52] U.S. Cl. ...................................... 119/15.5 R; 54/11
[58] Field of Search ..................... 54/10, 11; 119/15.5, 119/110, 104, 10, 11; 343/228

[56] References Cited

U.S. PATENT DOCUMENTS

| | | | |
|---|---|---|---|
| 382,961 | 5/1888 | Finigan | 119/15.5 |
| 1,126,697 | 2/1915 | Brown | 54/11 |
| 3,505,979 | 4/1970 | Rosswag | 119/110 |

*Primary Examiner*—Hugh R. Chamblee
*Attorney, Agent, or Firm*—John J. Leavitt

[57] ABSTRACT

Presented is an apparatus for starting horse races and including a hood equipped with blinders and adapted to be applied on the head of a horse so as to control the vision pattern of the horse from zero vision pattern through full vision pattern.

12 Claims, 9 Drawing Figures

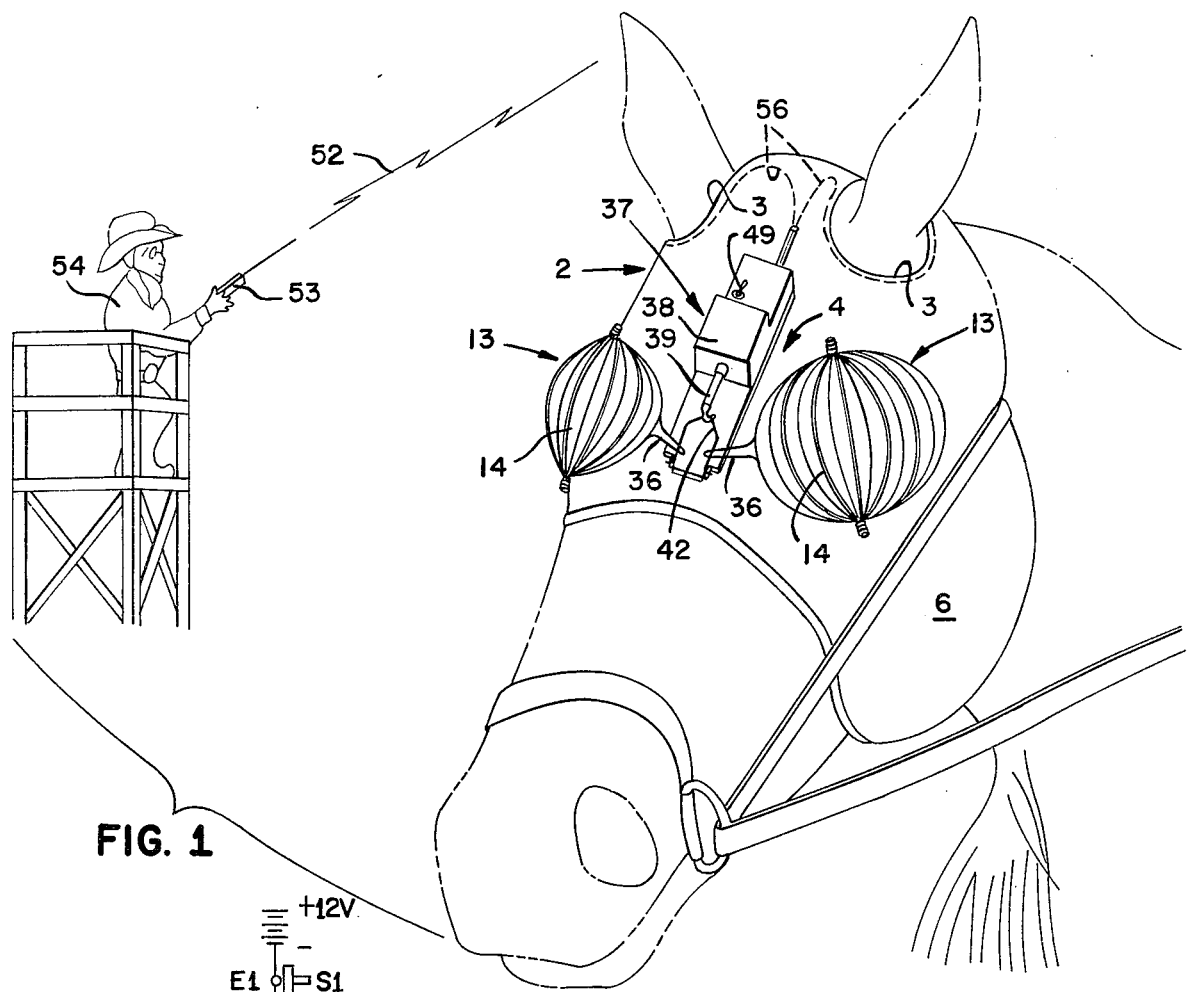
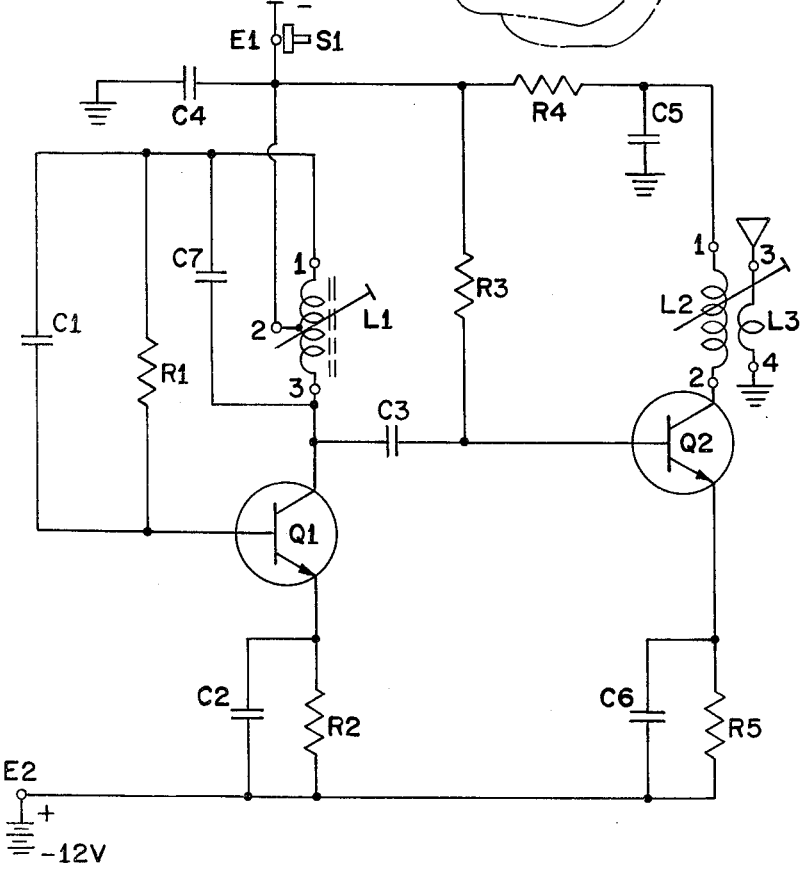
FIG. 1
FIG. 9

APPARATUS FOR STARTING HORSE RACES AND METHOD AND MEANS FOR MANUAL AND REMOTE CONTROL THEREOF

BACKGROUND OF THE INVENTION

1. Field of the Invention

This invention relates to apparatus for starting horse races and otherwise exercising control over a horse by controlling its vision pattern, and particularly to a hood adapted to be worn by a horse and including a mechanically operable blindfold or blinder apparatus that may be operated manually to cut off the horse's vision, or operated from a remote point to restore the horse's vision by opening the blinder apparatus.

2. Description of Prior Art

It is believed the prior art pertaining to this invention may be found in Class 119, sub-class 104; and Class 54, sub-classes 4, 10, 11, 15, 160 and 350. A search in these classes and sub-classes has revealed U.S. Pat. Nos. 721,760; 960,648 and 1,126,697. These patents all pertain to the general subject of providing a blinder-type structure to cover a horse's eyes, but none of these patents teach the concept of a remotely controlled device for re-establishing the normal vision pattern of a horse, or otherwise controlling the extent of such vision pattern.

Accordingly, one of the objects of the invention is the provision of an apparatus operable to initiate the starting of a horse race.

Another important object of the invention is the provision of a hood to be worn by a horse and incorporating a blinder apparatus for horse's and a method and means for manipulating the blinder apparatus to selectively control the vision pattern of the horse.

Race horses may conventionally be provided with a hood made from an appropriate fabric. Such hoods, when used, cover the horse's forehead and are provided with apertures that expose the horse's eyes and permit a normal vision pattern for the horse. Additionally, the hoods are provided with apertures through which the ears project, and are adapted to be buckled under the head to prevent inadvertent displacement while the horse is running. It is another object of the present invention to incorporate on such a hood, a blinder apparatus for the horse's eyes that may be manually operated to cut off the horse's vision, thus causing the horse to stand stock still at the place where the blinders are closed, yet which may be activated from a remote location to retract the blinders, either partially or wholly, to thereby re-establish a selected vision pattern for the horse.

Conventionally, in horse racing, a metal starting gate is utilized which extends across the race track and which provides individual "gates" behind which a horse is confined until such time as the starting bell is sounded. It has been found that many horses are skittish and that such skittishness is contagious, frequently causing disruption of the process by which horses are brought to the starting gate. Frequently, a horse will attempt to bolt from the gate, sometimes injuring the rider. Accordingly, it is another important object of this invention to provide a method and means for starting race horses which eliminates the conventional gate structure, which permits a multiplicity of race horses to be brought to a designated line and which causes them to stand stock still at the line until the starting bell is sounded.

It is generally know among people that are familiar with the idiosyncrasies of horses, that when you cover a horse's eyes it will stand stock still until led from the spot. Accordingly, it is another object of the present invention to provide a hood structure for a race horse incorporating simultaneously operable mechanical blinders for both eyes, which blinders may be closed and latched by an attendent before or after the horse has been brought to a starting line, and incorporating signal receiver means for receiving a starting signal from a signal transmitter activated by a "starter", the receiver incorporating mechanism to unlatch the blinders so as to expose the horse's eyes and re-establish its normal pattern of vision, while simultaneously signalling the start of the race.

Race horses have been conditioned through the years to respond to the sounding of a bell to signify commencement of a race. When race horses so conditioned hear the starting bell, they lunge forward to commence the race. Accordingly, another object of the present invention is to provide a hood and blinder structure for race horses that may be operated from remote point by a starter and which operates in conjunction with or incorporates a bell audible to the horse and signifying commencement of the race.

While most race horses run with a full vision pattern, some race horses, because of their own peculiar idiosyncrasies, run better if they do not see the horses to either side or behind them. For such horses, the conventional hood is equipped with a quarter spherical blinder in the form of a quarter of a spherical shell that is attached to the hood so that the shells or blinders lie behind the horses eyes, thus permitting only limited side vision while permitting full forward vision. It is therefore another object of this invention to provide a mechanically operated blinder mechanism for race horses that may be manually actuated to completely cut off the horses pattern of vision, and which may be actuated remotely to restore the horse's full vision pattern or only a partial vision pattern.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the remotely controlled horse race starter and blinder assembly of the invention comprises a supporting member adapted to be worn on the horse's head and which may comprise a cloth or fabric hood provided with apertures for the horse's eyes and apertures for the ears and which buckles securely under the horse's head. Extensible and retractable blinders are mounted on the hood or supporting structure in a position, when extended, to cover the horse's eyes and when retracted, to uncover the horse's eyes and re-establish the normal pattern of vision. Means are also provided for latching such blinder in closed or extended position to cover the horse's eyes so as to cut off its vision. Additionally, means are provided for unlatching the blinders so as to permit them to open or retract so as to uncover the horse's eyes and reestablish the normal pattern of vision. Such means may include a signal transmitter capable or initiating a signal transmitted by a starter and received by an appropriate receiver carried on the hood or support structure on the horse's head and operatively interconnected with the blinders to effect unlatching thereof.

BRIEF DESCRIPTION OF THE DRAWINGS

FIG. 1 is a perspective view illustrating schematically the horse race starting system including the transmission and reception of an activating or initiating signal transmitted by the starter, and illustrating also the blinder apparatus extended into closed position to cover the horse's eyes which may be remotely actuated to uncover the horse's eyes and reestablish its normal vision pattern.

FIG. 9 is a circuit diagram illustrating the construction of the transmitting or control unit operated by the starter to initiate the race and which transmits the singal received by the receiver unit carried by the horse.

DESCRIPTION OF THE PREFERRED EMBODIMENT

Figure 2:
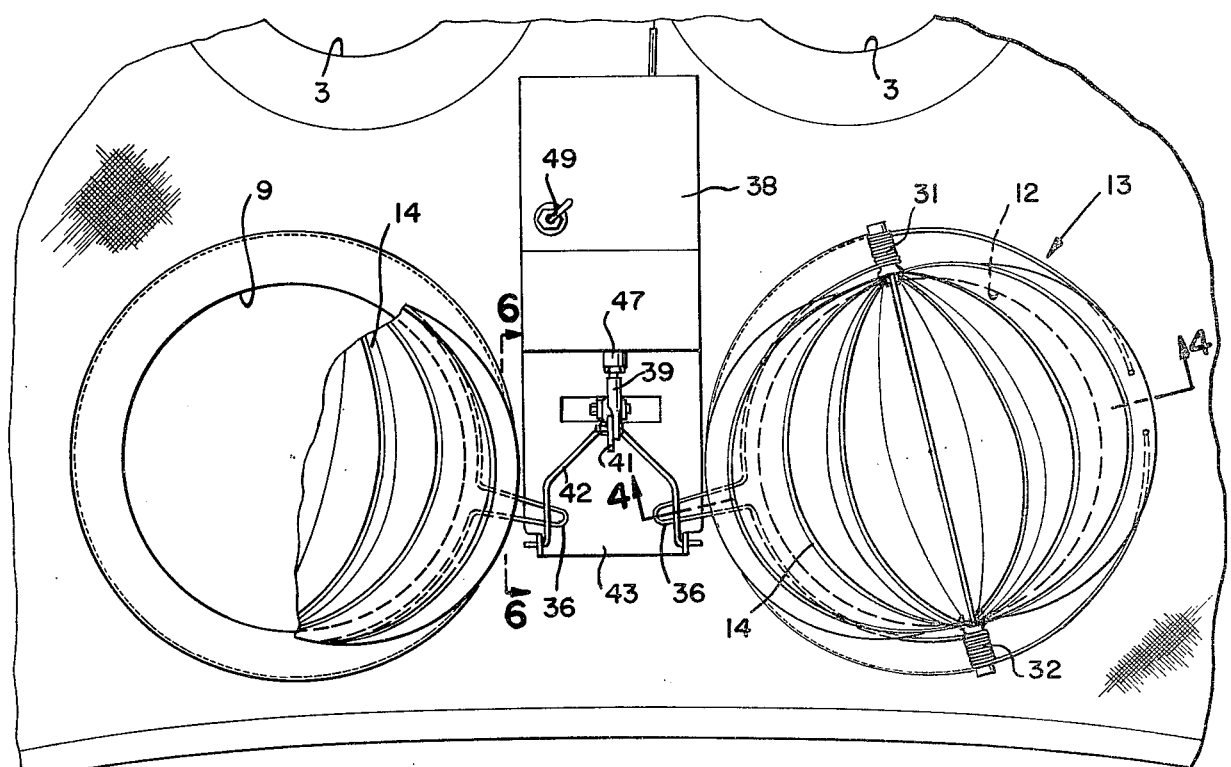
FIG. 2 is a fragmentary plan view of one of the blinder devices attached to a hood and illustrating the blinder in a closed or extended position in which position it covers the horse's eye to cut off the horse's vision.

This invention is particularily useful in connection with the control of race horses at the starting line of a race prior to starting of the race, and to the actual starting of the race, but may be utilized under any circumstances where it is necessary to control a horse by covering its eyes to cut off its vision. It is an idiosyncrasy of a horse that when its vision is cut off it will stand motionless until it receives an instruction to move. This is generally effected through being led by an attendent, or through response to an audible signal that the horse recognizes as an instruction. The subject matter of this invention includes an supporting structure carried on the horse's head and which is preferably a fabric hood designated generally by the numeral 2 and adapted to be worn on the horse's head, being provided with spaced apertures 3 to receive the horse's ears and a central support section 4 that generally lies over the horse's forehead, this area generally lying transversely between the horse's eyes and vertically between the ears and the eyes. On each side of the head, the hood is provided with depending portions 6 that wrap downwardly under the horse's head and which are secured by appropriate straps (not shown) equipped with buckles to securely fasten the hood to the horse's head so that it will not shift in position while the horse is running.

The hood is also provided with apertures 9 and 12 formed in the hood in a position so that the apertures surround the horse's eyes. Thus, referring FIG. 3, the aperture 9 is associated with the right eye of the horse while the aperture 12 is associated with the left eye of the horse. Each aperture is proportioned in diameter to completely surround the associated eye so as to provide no hindrance to the normal vision pattern of the horse.

Mounted on the hood in a position that is cooperatively related to each of the apertures 9 and 12 surrounding the eyes is a blinder assembly designated generally by the numeral 13 and including a shutter or bellows-like semi-spherical cover or blinder member 14 for each eye. Each of the blinder members 14 constitutes a separate sub-assembly that is fastened to the underlying hood in association with one of the apertures 9 and 12 so that when desired, the blinder member may be closed and latched in a closed position in a manner which will hereinafter be explained. When the blinders are so closed over the horse's eyes, it will be apparent that the horse's vision pattern is interrupted or cut off so that it cannot see in any direction. Because horses are fearfull of moving about when their eyes are covered, it renders an otherwise skittish horse very docile and subject to ready control by an attendant. Then, at an appropriate moment, when it is desired that the eyes be uncovered, such as when it is desired that the horse race begin, the blinder members are constructed in such a way that they may be unlatched and they will automatically be retracted into either a partial or full open position so as to expose the horse's eyes and to restore whatever portion of the horse's vision pattern is desired by the owner.

Figure 3:
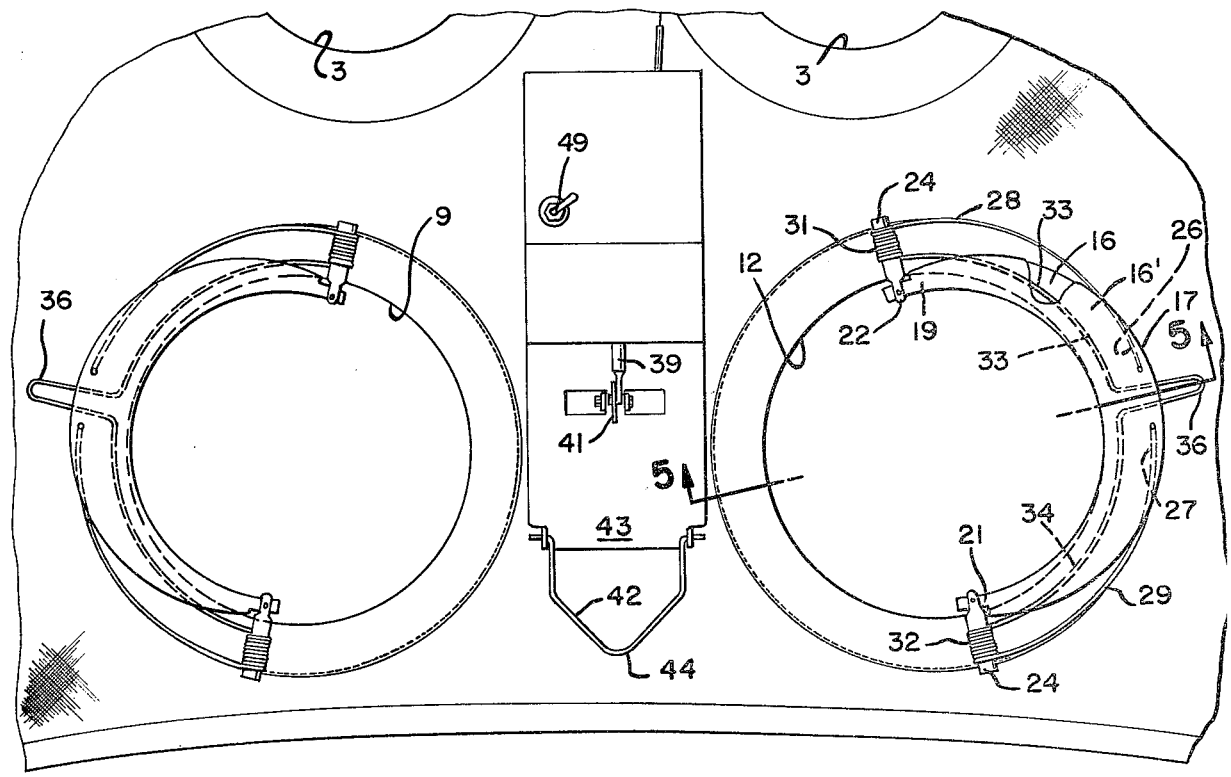
FIG. 3 is a fragmentary plan view similar to FIG. 2 but illustrating the blinder in retracted eye-exposing position.
Figure 4:
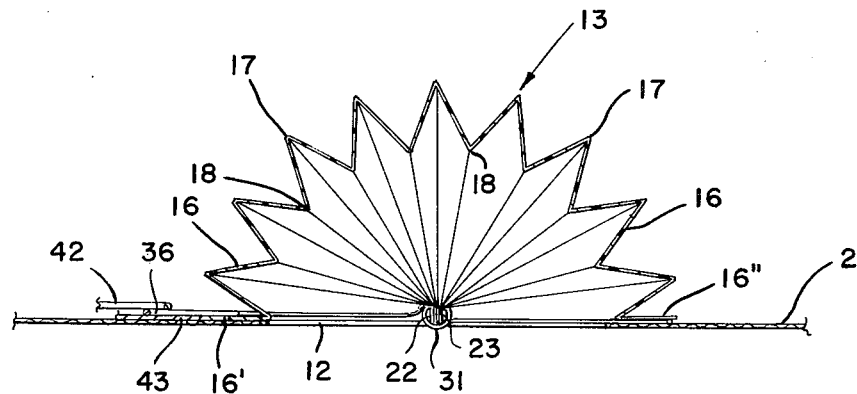
FIG. 4 is a fragmentary cross-sectional view of the blinder in closed or extended position and taken in the plane indicated by the line 4—4 in FIG. 2.
Figure 5:
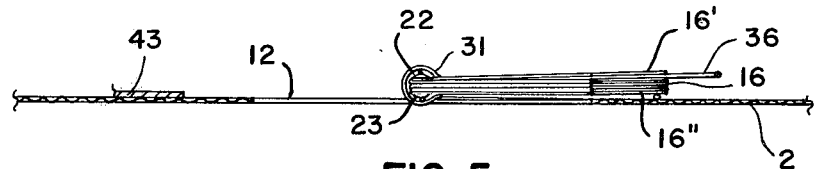
FIG. 5 is a fragmentary cross-sectional view of the blinder in open position, taken in the plane indicated by the line 5—5 in FIG. 3.

To effect these results, each of the blinder members is comprised of a multiplicity of arcuate sectors fabricated from a thin flexible material such as an appropriate plastic material that is opaque. Referring to FIGS. 3 and 4, it will be seen that in FIG. 3 the blinder member 14 is shown in a full open position in association with the aperture 12, with each of the arcuate sectors 16 being stacked one above the other so as to constitute a flat pack as illustrated in FIG. 5. In FIG. 4, the arcuate sectors 16 are shown expanded or extended into an aperture-closed position in which the arcuate sectors cooperate one with the other to form a hollow substantially semi-spherical or dome-shape covering over the opening 12 so as to cut off the horse's vision pattern through that opening.

Referring to FIG. 4, it will there be seen that there are conveniently a total of twenty (20) such arcuate sectors 16, the sectors designated 16' and 16" constituting the end sectors of the assembly as viewed in FIG. 4. The sectors are identical with each other and in the interest of brevity in this description only one will be described in detail. Thus, referring to FIG. 3, where one of the sectors is illustrated in plan, it will be seen that each of the sectors is provided with an outer arcuate periphery 17 and an inner arcuate periphery 18, the inner and outer peripheries having different radii and different centers so that the inner and outer peripheries converge toward each other at substantially diameterically opposed locations to provide relatively narrow mounting portions 19 and 21 as shown. As previous indicated there being twenty of these flexible and opaque arcuate sectors, when stacked as illustrated in FIG. 5 so that the peripheral edges lie in correspondence with one another, the collective mounting portions 19 and 21 of the arcuate sectors also lie in superposed correspondence and are fastened together or bound in much the same way that pages in a book are bound by inserting the layer of mounting portions 19 and 21 between the bifurcated fingers 22 and 23 (FIGS. 3 and 5) formed on cylindrical bearing member 24 and retaining them therein by an appropriate rivet extending through the mounting sections and both fingers 22 and 23. As illustrated in FIG. 3, there are two such cylindrical bearing members 24, one associated with each of the mounting portions 19 and 21 of the stack of arcuate sectors and positioned as illustrated so that they lie on opposite sides of the associated aperture 9 or 12 with their longitudinal axes being coincident.

Prior to binding the mounting portions 19 and 21 of the arcuate sectors 16 between the bifurcated fingers 22 and 23, the stacked arcuate sectors are connected to each other so that starting from either end of the stack, say the top as viewed in FIG. 5 and the left in FIG. 4, the first arcuate sector 16' has its inner peripheral edge 18 bonded or otherwise connected to the inner peripheral edge 18 of the second or next adjacent arcuate sector 16, while the second arcuate sector has its outer peripheral edge portion 17 bonded or otherwise connected to the outer peripheral portion of the third arcuate sector, etc. In this way, it will be seen that each of the arcuate sectors commencing with the second arcuate sector is bonded at both its inner and outer peripheral edge portions to the next adjacent arcuate sector. Note that the arcuate sectors 16' and 16" are bonded only at their inner peripheral edge portions to the next adjacent arcuate sector, the next adjacent arcuate sector in each case being the second arcuate sector from each end of the stack.

With the arcuate sectors thus bonded together, it will be seen that from the position illustrated in FIG. 5, in which all of the arcuate sectors are stacked one upon another as illustrated, if the bottom sector 16" is secured to the underlying hood 2 and the opposite end sector 16' is extended into the position illustrated in FIG. 4 in which it lies on the opposite side of the opening from the sector 16" since all of the sectors are connected at their inner and outer peripheries as previously described, the assembly of arcuate sectors will be extended as illustrated in FIG. 4 to form a dome-shaped enclosure that closes off the associated opening 9 or 12.

In the embodiment illustrated, the arcuate sector 16" associated with each of the assemblies is stitched or otherwise permanantly secured to the underlying material of the hood 2, and partially overlies the arcuate end portions 26 and 27 of arcuate spring sections 28 and 29. The arcuate spring section 28 is the terminal portion of a coil spring 31 wound in a coil having an inner diameter sufficient to receive the cylindrical bearing member 24. The arcuate spring section 29 constitutes the other terminal portion of a coil spring 32 position diametrically across the aperture 12 (or 9) from the coil spring 31 and also wound to provide an inner diameter sufficient to receive the bearing member 24 therein as illustrated. The opposite ends of the coil springs 31 and 32, i.e., the ends of these coils 31 and 32 that lie adjacent the inner periphery of the associated aperture, continue from the coils in arcuate spring wire sections 33 and 34 which converge toward each other and toward a plane substantially perpendicular to the plane which includes the longitudinal axes of the coil springs 31 and 32, and form a radially outwardly projecting generally U-shaped latch member 36 as shown.

As indicated in FIGS. 3 and 4, the latch member 36 projects beyond the outer peripheral extremity of the next adjacent arcuate member 16', and the latch member 36, with the associated arcuate spring wire sections 33 and 34, lie disposed between the arcuate sector 16' and the next adjacent or second arcuate sector, the spring wire sections 33 and 34 lying substantially in the gore formed between these two sectors so that when the latch member 36, as viewed in FIG. 5, is lifted and swung through 180° into the position illustrated in FIG. 4, the arcuate sector 16' is forced to lie next adjacent to the fabric hood 2 while the arcuate sector 16" remains attached to the hood material on the opposite side of the aperture 12, and the intermediate arcuate sectors spread themselves into an accordian-like pleated assembly as illustrated in FIG. 4 to form an opaque dome or canopy over the associated apeture 9 or 12. Where desired, the arcuate spring wire end portions 33 and 34 may be suitably secured to the arcuate sector 16' to insure that when the latch member 36 is swung through 180° the arcuate sector 16' will follow it and draw the remaining arcuate sectors into the position illustrated.

It will thus be seen that as the latch member 36 with the attendant spring wire end sections 33 and 34 is swung through 180°, each of the coil springs 31 and 32 is tensioned or "loaded" so that when the latch member 36 is in the position illustrated in FIG. 4, there is a substantial resilient biasing force in the coils 31 and 32 tending to return the latch member 36 to the position illustrated in FIGS. 3 and 5. Thus, once the blinders 14 are extended into the position illustrated in FIG. 4, in which position the apertures 9 and 12 are completely closed or covered, all that is required to effect opening or uncovering of the apertures so as to restore vision to the horse is that the latch members 36 be released, whereupon the resiliency loaded into the coil springs 31 and 32 immediately causes the blinders 14 to be retracted into the position illustrated in FIGS. 3 and 5.

Means are provided to selectively retain the blinders in a closed or latched position, and to selectively permit release of the latch members 36 so as to permit rapid retraction of the blinders. When the hood 2 equipped with the blinders 14 described above is placed on the horse's head, the blinders are resiliently biased open as seen in FIGS. 3 and 5 and the horse has a normal vision pattern. When the blinders are closed however, as illustrated in FIGS. 1, 2 and 4, the horse's vision is cut off and as a consequence it will stand stock still. It is within the contemplation of this invention that the blinders will be manually closed by the attendant who leads the horse to the starting line. To accomplish this purpose, the apparatus includes a blinder latching and release structure designated generally by the numeral 37, and mounted on the hood 2 as illustrated in FIGS. 1, 2 and 3, and constructed to include the circuit illustrated in FIG. 8, the components of which with their values, are listed hereinafter. The blinder latching and release apparatus includes a housing 38 within which is enclosed the circuit illustrated in FIG. 8, and from which projects a solenoid-actuated shaft 39 having a latch plate 41 (FIG. 6) pivotally mounted on the end thereof. The latch plate 41 is adapted to engage a bail 42 pivoted on the base plate 43, the bail being pivoted into or out of latching engagement with the latch plate.

Thus, in the normal condition of the system and apparatus, the bail 42 is unlatched as indicated in FIG. 3. In this condition, the solenoid-actuated shaft 39 is retracted into the housing 38, and the latch member 36 with attendant spring-wire arcuate sections 33 and 34, is retracted into the position illustrated in FIG. 3, holding the blinder arcuate sectors in a compact stack as seen in FIG. 5. This, then, is the full-open position of the blinders that permits the horse a full and complete vision pattern. When it is desired to cover the horse's eyes to cut-off its vision pattern, the latch members 36 of the blinder assemblies are swung through 180° so that they underlie the bail 42, as viewed in FIGS. 2 and 6. The apex end 44 of the bail is caught in a slot 46 formed in latch plate 41. The lower end of latch plate 41 is pivoted to the base as shown in FIG. 6, while its upper end portion is pivotally connected to the end of the solenoid-actuated shaft 39.

Figure 6:
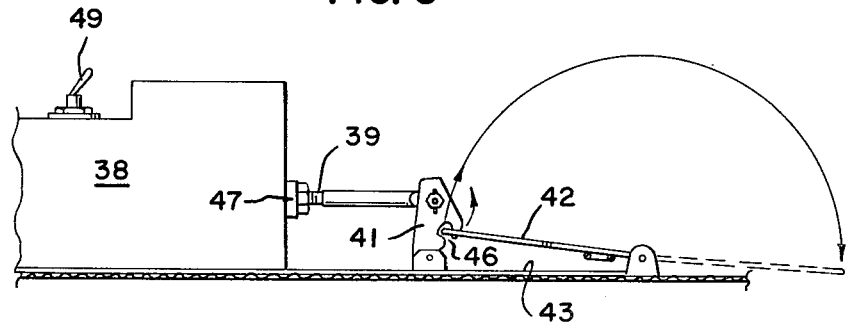
FIG. 6 is a fragmentary side elevational view taken in the direction of the arrows 6—6 in FIG. 2.

With the latch members 36 caught as illustrated under the bail 42, the resilient biasing force of the coil springs 31 and 32 imposes a force on the bail tending to rotate it clockwise as viewed in FIG. 6. This rotational tendency is resisted, however, by the latch plate 41, which is pivotally attached to the base plate 45. The shaft 39 constitutes an extension of the armature 47 working in conjunction with a solenoid coil 48, enclosed within the housing 38 and shown diagrammatically in FIG. 8. Thus, when the attendant wishes to cover the horse's eyes, he swings the latch member through 180° and engages the bail in the latch plate so that the bail overlies the latch members 36. In this position of the latch plate 41 the solenoid armature is in extended position. The attendant then "arms" the device by manipulating single pole-single throw switch 49 from a switch "OFF" condition, i.e., no current flowing through the switch, to a switch "ON" condition in which the battery 51 is connected into the circuit through the switch 49.

Figure 8:
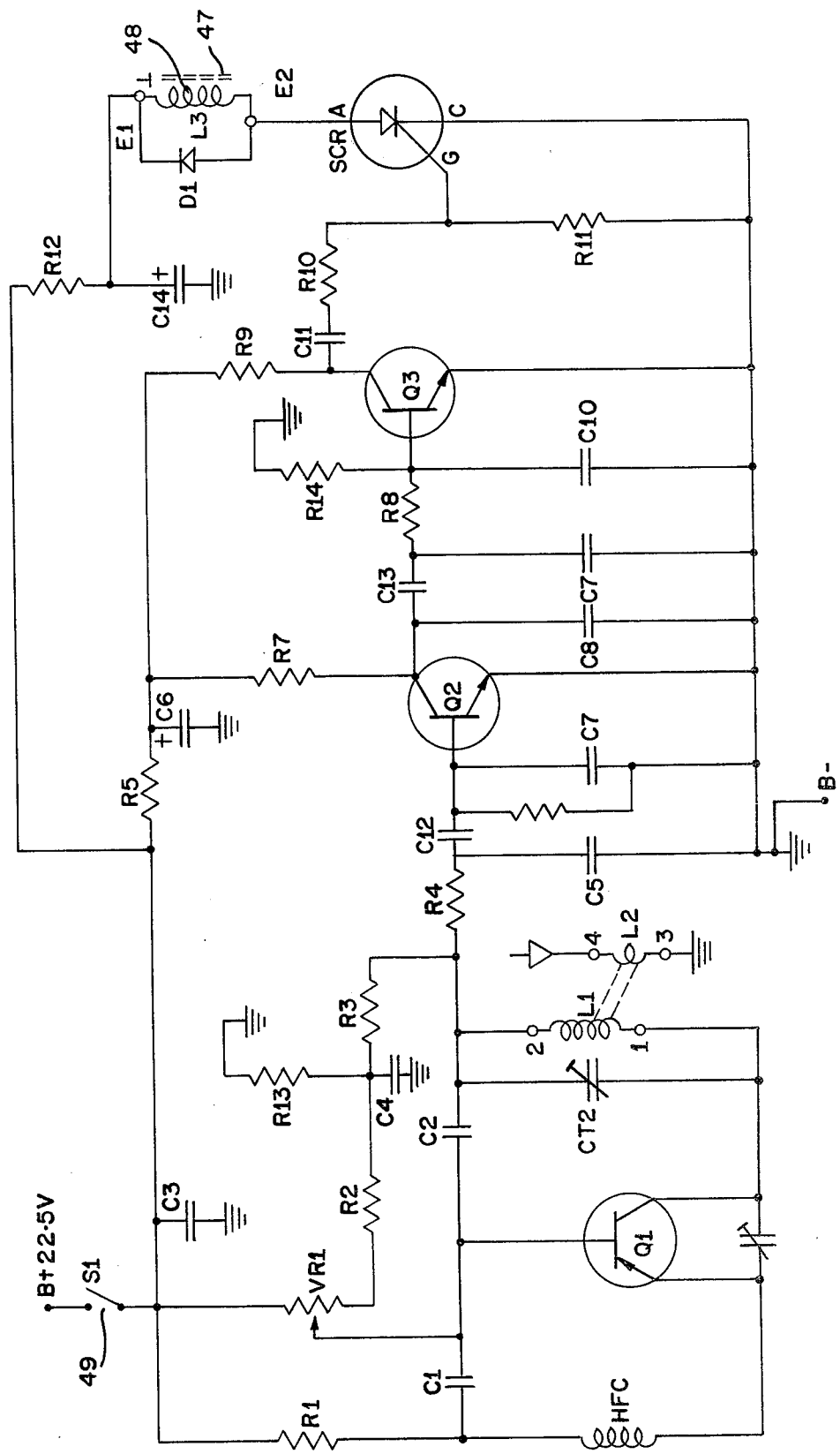
FIG. 8 is a circuit diagram illustrating the construction of the signal receiver unit carried by the horse and which is activated to release or unlatch the blinders to permit the retraction thereof to thus uncover the horse's eyes.

With the circuit of FIG. 8 thus "armed" by turning the switch "ON", the device is now "conditioned" to receive a radio signal 52 transmitted by a transmitting or control unit 53 controlled by a "starter" 54 and received by receiver antenna 56 sewn or otherwise secured to the hood. The transmitter or control unit is shown in diagrammatic form in FIG. 9, and the components that make up the control unit circuitry are listed hereinafter. As soon as the signal is received by the antenna 56 on the horse's head, the "armed" circuit of FIG. 8 is activated to energize the solenoid 47-48, which sucks in the armature, thus releasing the bail, which is pivoted backwardly and out of the path of the latch members 36 by the resilient loading of the coil springs 31 and 32. The same signal is effective to cause a bell (not shown) to ring and, since the horse's eyes are now uncovered, and since they are conditioned to start running when they hear the bell, the horses lunge forward to initiate the race.

Referring to FIG. 8, I have achieved satisfactory results from the release unit 37 when fabricated with components, identified in FIG. 8, having the following values:

---

R-1 - 3.3K - ¼W
R-2 - 47K - ¼W
R-3 - 10K - ¼W
R-4 - 4.7K - ¼W
R-5 - 3.3K - ¼W
R-6 - 220K - ¼W
R-7 - 1.5K - ¼W
R-8 - 2.2K - ¼W
R-9 - 1.5K - ¼W
R-10 - 10K - ¼W
R-11 - 100K - ¼W

-continued

R-12 - 3.3K - ¼W
R-13 - 15K - ¼W

C-1, C-2, C-4 - 0.001ufd.
C-3, C-5, C-9, C-11 - .1ufd.
C-6 - 100ufd.
C-7, C-13 - .05ufd.

C-8 - 100PF
C-10, C-12 - .02ufd.
C-14 - 1500u

D-1 - 1N4002
VR-1 - 50k Helitrim (min')
CT-1 - Erie 4-14pf (min')
CT-2 - Erie 4-15pf (min')
HFC - Ohmite Z-220

Q-1 - HEP 57
Q-2, Q-3 - 2N2222
SCR - 2N2322

L-1 - SEC. 4 turns, 22G. ⅜" diam. single turn spacing.
L-2 - PRIM. 1½ turns, 22G. ⅜" diam. single turn spacing.
L-3 - Guardian Elect. Sol.- 12Y - 500 ohms.

Antenna - 2'4" sewn into hood material.

---

Referring to FIG. 9, I have achieved satisfactory results from the transmitter unit 53 when constructed with components, identified in FIG. 9, having the following values:

---

R-1 - 6.8K - ¼W
R-2 - 1K - ¼W
R-3 - 8.2K - ¼W
R-4 - 100Ω - ¼W
R-5 - 150Ω - ¼W

C-1 - .05ufd.
C-2 - .001ufd.
C-3 - 100pf
C-4 - .1ufd.
C-5 - .1ufd.
C-6 - 0.1ufd.

Q-1 - HEP 720
Q-2 - MM 4000

Antenna - 3'7" long.

L-1 - 22G. wire single turn spacing. 4½ turns center tapped on ⅜" adjustable dust core former.
L-2 - 22G. wire single turn spacing. 5 turns on ⅜" adjustable dust core former.
L-3 - 22G. wire single turn spacing. 2 turns overwound cold end of L-2.

---

Figure 7:
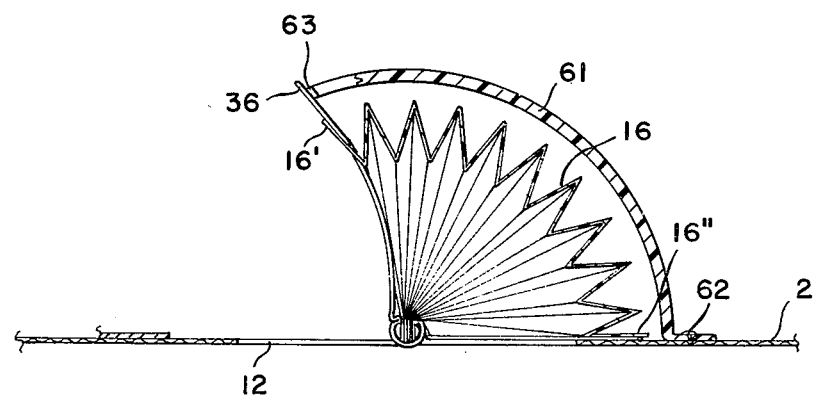
FIG. 7 is a fragmentary cross-sectional view of the blinder shown arrested in partially open condition.

Because of the idiosyncracies of some horses, it is an advantage to be able to control the degree of opening action of the blinders. For this purpose, referring to FIG. 7, I provide an abutment strip 61, curved as illustrated so as to extend over the blinder canopy, and detachably secured to the hood 2 by appropriate snap-fasteners 62. At its free end the abutment strip is provided with a cross member 63 against which the latch member 36 may abut after a partial excursion in an opening direction. The degree of opening action may be controlled by controlling the length of the strip, or by making the strip as a two-part member (not shown) retractable or extensible to a selected degree. Preferably, there is sufficient flexibility in the abutment strip 61 and the hood to which it is fastened that it may be manually displaced laterally sufficiently to permit manual closing movement of the latch member 36. Thus, when the latch member 36 is released by the bail 42, the blinder will be only partially retracted, as viewed in FIG. 7, by virtue of the latch member coming into engagement with the cross member 63 returned to its normal position after closing of the associated blinder.

Having thus described the invention, what is believed to be new and novel and sought to be protected by letters patent of the United States is as follows:

I claim:

1. Apparatus for controlling the vision pattern of a horse comprising:
    (a) a hood adapted to be mounted on the head of a horse and having apertures therein corresponding in position to the position of the eyes of the horse whereby when said hood is placed on the horse's head, said apertures surround the horse's eyes;
    (b) blinder means associated with each of said apertures and manipulable from a fully open position in which the horse's vision pattern is unrestricted to a fully closed position in which the associated aperture is covered and the vision pattern of the horse is cut off;
    (c) means on said hood operatively associated with said blinders for manually releasably latching said blinders in closed condition and including electrically operated means for releasing said blinders whereby said blinders are retracted into a position in which said apertures are uncovered and the vision pattern of the horse is restored; and
    (d) means remote from said electrically operated means for releasing said blinders selectively operable to energize said electrically operated means to effect unlatching of said blinders to effect release thereof for return to their fully open position.

2. The combination according to claim 1, in which said blinders comprise a pair of dome-shaped canopies opaque to the passage of light, and means operably associated with each of said dome-shaped canopies normally resiliently biasing said canopy into a full aperture-open position.

3. The combination according to claim 1, in which said means mounted on said hood associated with said blinders for releasably latching said blinders in a closed condition comprises a battery operated radio signal receiving structure including a solenoid operatively connected to a latch plate, and a bail releasably engagable by said latch plate to retain said blinders in a closed and releasably latched condition.

4. The combination according to claim 1, in which said means for initiating unlatching of said blinders comprises a radio transmitting unit adapted to transmit a radio signal received by said means on said hood associated with said blinders and operable upon receipt of such radio signal to trigger unlatching of said blinders.

5. The combination according to claim 1, in which means are selectively associated with one or both of said blinders to limit opening action thereof to control the extent of the vision pattern of the horse.

6. The combination according to claim 1, in which said means on said hood associated with said blinders to releasably latch said blinders in a closed condition includes a signal-receiving antenna mounted on said hood, a control circuit operatively connected to said antenna to receive a signal therefrom, and a solenoid connected to said control circuit and actuated thereby when a signal is received by said antenna to effect release of said blinders whereby the apertures in said hood surrounding the horse's eyes are uncovered to restore a selected vision pattern for the horse.

7. The combination according to claim 1, in which each said blinder associated with each said aperture when in open condition comprises a multiplicity of arcuate sectors of flexible and opaque material placed in juxtaposition to one another to form a flat stack adapted to lie generally flat against the hood adjacent a peripheral portion of an aperture, each of said arcuate sectors having an inner arcuate periphery and an outer arcuate periphery, selected inner and outer peripheries of said arcuate sectors being connected in such a way that said interconnected arcuate sectors may be expanded to form a dome-shaped canopy opaque to the passage of light when said blinder is closed or collapsed to form a flat pack in which arcuate sectors lie in juxtaposition to each other adjacent a peripheral portion of a associated aperture when said blinder is open.

8. The combination according to claim 1, in which means are associated with each of said blinders normally resiliently retaining said blinders in an open condition, and manipulable with said blinder to cover the associated aperture and when in aperture-covering position, being resiliently biased toward an aperture-opening position.

9. The method of starting a horse race involving a multiplicity of horses comprising the steps of:
    (a) leading each horse to a predetermined position designated as the starting line for the race;
    (b) closing off the vision pattern of each horse by manually actuating blinders worn by each horse; and
    (c) restoring the vision pattern for all of the horses simultaneously when the race is to commence by transmitting a signal from a remote location which activates a release unit which initiates retraction of the blinders on each horse to restore its vision pattern.

10. The method according to claim 9, in which the vision pattern of each horse is independently interrupted by an attendant when the horse is brought to the starting line.

11. The method according to claim 9, in which the vision pattern of each horse is eliminated by covering the horse's eyes.

12. The method according to claim 9, in which simultaneous uncovering of the horse's eyes is effected by transmission of a radio signal.

* * * * *